United States Patent
Kondou et al.

(10) Patent No.: US 11,851,627 B2
(45) Date of Patent: Dec. 26, 2023

(54) GREASE COMPOSITION FOR TAPERED ROLLER BEARING AND TAPERED ROLLER BEARING

(71) Applicant: NTN CORPORATION, Osaka (JP)

(72) Inventors: Ryouta Kondou, Mie (JP); Takayuki Kawamura, Mie (JP)

(73) Assignee: NTN CORPORATION, Osaka (JP)

( * ) Notice: Subject to any disclaimer, the term of this patent is extended or adjusted under 35 U.S.C. 154(b) by 61 days.

(21) Appl. No.: 17/605,570

(22) PCT Filed: Apr. 20, 2020

(86) PCT No.: PCT/JP2020/017053
§ 371 (c)(1),
(2) Date: Oct. 21, 2021

(87) PCT Pub. No.: WO2020/218239
PCT Pub. Date: Oct. 29, 2020

(65) Prior Publication Data
US 2022/0204881 A1 Jun. 30, 2022

(30) Foreign Application Priority Data
Apr. 26, 2019 (JP) ................. 2019-086466

(51) Int. Cl.
*C10M 135/10* (2006.01)
*C10M 117/02* (2006.01)
(Continued)

(52) U.S. Cl.
CPC ........ *C10M 135/10* (2013.01); *C10M 117/02* (2013.01); *C10M 117/06* (2013.01);
(Continued)

(58) Field of Classification Search
CPC ............ C10M 135/10; C10M 117/02; C10M 117/06; C10M 137/10; C10M 169/06;
(Continued)

(56) References Cited

U.S. PATENT DOCUMENTS 5,803,616 A    9/1998 Persson et al.
2007/0155634 A1  7/2007 Kubota et al.
(Continued)

FOREIGN PATENT DOCUMENTS

CN    1165254 A     11/1997
CN    101010419 A    8/2007
(Continued)

OTHER PUBLICATIONS

"The Lubricant Base Oil and Additive Catalog", BASF Japan Ltd; (retrieval date Jun. 26, 2020), Internet : URL:https://www.basf.com/jp/images/products-and-industories/Auto/, Irgalube TPPT, Irgalube 349, tables.
(Continued)

*Primary Examiner* — Prem C Singh
*Assistant Examiner* — Francis C Campanell
(74) *Attorney, Agent, or Firm* — Hedman & Costigan, P.C.; James V. Costigan; Kathleen A. Costigan (57) ABSTRACT

To provide a grease composition for a tapered roller bearing having superior bearing lifetime under a condition of high temperature and a condition of high load, and a tapered roller bearing in which the grease composition for the tapered roller bearing is filled. A tapered roller bearing 11 includes an inner ring 12 having a raceway surface 12a, an outer ring 13 having a raceway surface 13a and a plurality of tapered rollers 14, and a flange part of the inner ring 12 gets into sliding contact with the tapered rollers 14. Grease 16 is filled around the tapered rollers 14. The grease 16 includes a base oil, a thickener and an additive. A frequency
(Continued)

in which a storage modulus, which varies depending on frequency, of the grease 16 becomes minimum is equal to 7 Hz or more.

3 Claims, 4 Drawing Sheets (51) Int. Cl.
*C10M 117/06* (2006.01)
*C10M 137/10* (2006.01)
*C10M 169/06* (2006.01)
*F16C 19/36* (2006.01)
*F16C 19/38* (2006.01)
*F16C 33/61* (2006.01)
*C10N 10/02* (2006.01)
*C10N 10/04* (2006.01)
*C10N 20/02* (2006.01)
*C10N 30/06* (2006.01)
*C10N 30/08* (2006.01)
*C10N 40/02* (2006.01)
*C10N 50/10* (2006.01)

(52) U.S. Cl.
CPC ........ *C10M 137/10* (2013.01); *C10M 169/06* (2013.01); *F16C 19/36* (2013.01); *F16C 19/38* (2013.01); *F16C 33/61* (2013.01); C10M 2203/1006 (2013.01); C10M 2207/1236 (2013.01); C10M 2207/1265 (2013.01); C10M 2207/2805 (2013.01); C10M 2219/046 (2013.01); C10M 2223/045 (2013.01); C10N 2010/02 (2013.01); C10N 2010/04 (2013.01); C10N 2020/02 (2013.01); C10N 2030/06 (2013.01); C10N 2030/08 (2013.01); C10N 2040/02 (2013.01); C10N 2050/10 (2013.01)

(58) Field of Classification Search
CPC .... C10M 2203/1006; C10M 2219/046; C10M 2223/045; C10M 2207/1276; C10M 171/00; C10M 169/00; C10M 2207/1256; C10M 2215/1026; F16C 19/36; F16C 19/38; F16C 33/66; F16C 19/386; F16C 33/6633; F16C 2210/02; F16C 2326/02; C10N 2010/02; C10N 2010/04; C10N 2030/06; C10N 2030/08; C10N 2040/02; C10N 2050/10; C10N 2030/76

USPC .......................................................... 508/390
See application file for complete search history.

(56) References Cited

U.S. PATENT DOCUMENTS

| | | | |
|---|---|---|---|
| 2010/0002975 A1* | 1/2010 | Ueno | ................... F16C 33/366 384/571 |
| 2011/0086785 A1 | 4/2011 | Kubota et al. | |
| 2011/0136578 A1 | 6/2011 | Kawamura | |
| 2013/0170777 A1* | 7/2013 | Ito | ....................... C10M 169/00 384/445 |
| 2015/0330451 A1 | 11/2015 | Inami et al. | |

FOREIGN PATENT DOCUMENTS

| | | | | |
|---|---|---|---|---|
| CN | 102144021 A | 8/2011 | | |
| CN | 104884591 A | 9/2015 | | |
| EP | 807763 A1 | 11/1997 | | |
| EP | 1801192 A1 | 6/2007 | | |
| EP | 1988147 A1 | 11/2008 | | |
| EP | 2540813 A1 | 1/2013 | | |
| EP | 2940108 A1 | 11/2015 | | |
| JP | 10-047361 A | 2/1998 | | |
| JP | 2006-77056 A | 3/2006 | | |
| JP | 2007-320987 A | 12/2007 | | |
| JP | 2010-59369 A | 3/2010 | | |
| WO | 2006028121 A1 | 3/2006 | | |
| WO | 2010027019 A1 | 3/2010 | | |
| WO | 2014102988 A1 | 7/2014 | | |
| WO | 2015083695 A1 | 6/2015 | | |
| WO | WO-2016123067 A1 * | 8/2016 | .......... | C10M 105/00 |
| WO | 2018061134 A1 | 4/2018 | | |

OTHER PUBLICATIONS

Machine translation of JP 2006-77056 dated Mar. 23, 2006.
Machine translation of JP 2007-320987 dated Dec. 13, 2007.
Machine translation of JP 2010-59369 dated Mar. 18, 2010.
Machine translation of JP 10-047361 dated Feb. 17, 1998.
Machine translation of CN 102144021 dated Aug. 3, 2011.
Machine translation of CN 101010419 dated Aug. 1, 2007.
Machine translation of CN 1165254 dated Nov. 19, 1997.
Machine translation of CN 104884591 dated Sep. 2, 2015.
Machine translation of WO 2018061134 dated Apr. 5, 2018.
Machine translation of WO 2015083695 dated Jun. 11, 2015.
Supplementary European Search Report issued in the corresponding European Patent Application—dated Dec. 12, 2022.

* cited by examiner

GREASE COMPOSITION FOR TAPERED ROLLER BEARING AND TAPERED ROLLER BEARING

TECHNICAL FIELD

The present invention relates to a grease composition for a tapered roller bearing. Further, the present invention relates to a tapered roller bearing filled with the grease composition for a tapered roller bearing, in particular relates to a tapered roller bearing used in a tapered hub unit that rotatably supports a wheel of a vehicle.

BACKGROUND ART

A tapered roller bearing has been widely used as a bearing in a power transmission system for a vehicle or an industrial use. For example, in a wheel support device that rotatably supports a wheel of a vehicle or the like, a tapered roller bearing with large load capacity and high rigidity is used as a rolling bearing that rotatably supports an axle hub. This tapered roller bearing is lubricated by a grease composition filled between an axle and the axle hub.

The tapered roller bearing used in the wheel support device is used under a severe condition of high speed and high load. In particular, since a large-side end surface of a roller and a flange part of a raceway ring slide with each other, a lubrication oil film of a lubrication grease is easily broken. The break of the lubrication oil film causes metal contact, and thereby heat generation and frictional wear might be increased. Thus, in order to improve lubrication performance under high speed and high load, improve load resistance, and prevent metal contact caused by the break of the lubrication oil film, grease containing an extreme pressure agent has been adopted.

As such grease containing an extreme pressure agent, grease for a wheel bearing of a vehicle has been known which contains base oil, diurea-based thickener, and organic molybdenum compound (see Patent Document 1). In Patent Document 1, the above-described grease is used to extend flaking lifetime and lubrication lifetime and to reduce fretting.

PRIOR ART DOCUMENT

Patent Document

Patent Document 1: JP 2006-077056 A

SUMMERY OF THE INVENTION

Problems to be Solved by the Invention

In recent years, the use environment of the bearing has become severe more and more because high performance, high rotation speed, and high load have been promoted in the device to which the tapered roller bearing is used. As the use environment of the tapered roller bearing becomes severe, the conventional grease composition might become difficult to be used for a long time.

An object of the present invention is, in order to solve such problems, to provide a grease composition for a tapered roller bearing having superior bearing life time under a condition of high temperature and high load, and a tapered roller bearing filled with the grease composition for a tapered roller bearing.

Means for Solving the Problems

A grease composition for a tapered roller bearing of the present invention is filled around tapered rollers of the tapered roller bearing that includes: an inner ring having a tapered raceway surface on an outer peripheral surface; an outer ring having a tapered raceway surface on an inner peripheral surface; and a plurality of the tapered rollers that roll between the raceway surface of the inner ring and the raceway surface of the outer ring, wherein either one of the inner ring and the outer ring has a flange part configured to get into sliding contact with the tapered rollers. The grease composition includes a base oil, a thickener and an additive. A frequency in which a storage modulus, which varies depending on frequency, of the grease composition for the tapered roller bearing becomes minimum is equal to 7 Hz or more.

The additive may contain an extreme pressure agent including phosphorus in a molecular structure (hereinafter, also referred to as a phosphorus-based extreme pressure agent), and the extreme pressure agent may contain 0.05-0.3 mass % of phosphorus relative to the whole of the grease composition.

The additive may further contain a calcium-based additive or a barium-based additive. Further, the thickener may be complex lithium soap.

A tapered roller bearing of the present invention includes: an inner ring having a tapered raceway surface on an outer peripheral surface; an outer ring having a tapered raceway surface on an inner peripheral surface; a plurality of tapered rollers that roll between the raceway surface of the inner ring and the raceway surface of the outer ring; and a grease composition filled around the tapered rollers. Either one of the inner ring and the outer ring has a flange part configured to get into sliding contact with the tapered rollers. The grease composition is the grease composition for the tapered roller bearing of the present invention.

The tapered roller bearing may be configured to be used under a condition of high temperature and a condition of high load. The condition of high temperature may be a temperature of 80° C. or more, and the condition of high load may be a maximum contact surface pressure on the inner ring and the outer ring of 0.5 GPa or more and a surface pressure on the flange part of 0.07 GPa or more.

The tapered roller bearing may be configured to be used as a tapered hub unit that rotatably supports a wheel of a vehicle.

Effect of the Invention

Since the grease composition includes the base oil, the thickener and the additive and the frequency in which the storage modulus, which varies depending on frequency, of the grease composition becomes minimum is equal to 7 Hz or more, its greasy state can be maintained until a high frequency under a condition of low strain that simulates small vibration of a vehicle and thereby the break of oil film on the flange part can be prevented by the presence of the grease on the flange part. As a result, the grease composition has superior bearing lifetime even when used under the condition of high temperature and the condition of high load.

Since the additive contains the phosphorus-based extreme pressure agent and the extreme pressure agent is contained by a specified amount relative to the whole of the grease composition, the extreme pressure performance can be obtained. Further, since the additive contains a calcium-based additive or a barium-based additive, it is considered that change of penetration can be suppressed and shear stability can be improved. Since the thickener is complex lithium soap, fiber in the thickener is hardly broken and superior shear stability can be obtained.

The tapered roller bearing of the present invention has superior bearing lifetime even when used under the condition of high temperature and the condition of high load because the grease composition for the tapered roller bearing of the present invention is filled therein.

MODE FOR CARRYING OUT THE INVENTION

The present inventors conducted a study in order to extend lifetime of a tapered roller bearing. As a result of the study, the present inventors found that the frequency in which the storage modulus becomes minimum and the lifetime of the tapered roller bearing are related to each other in a correlation diagram of the storage modulus of a grease composition and the frequency. Specifically, the present inventors found that the grease composition of which a viscous state transition frequency is equal to 7 Hz or more can maintain its greasy state until a high frequency under a condition of low strain that simulates small vibration of a vehicle and thereby the break of oil film on a flange part can be prevented by the presence of the grease on the flange part. The present invention has been derived from such knowledge.

Figure 1:
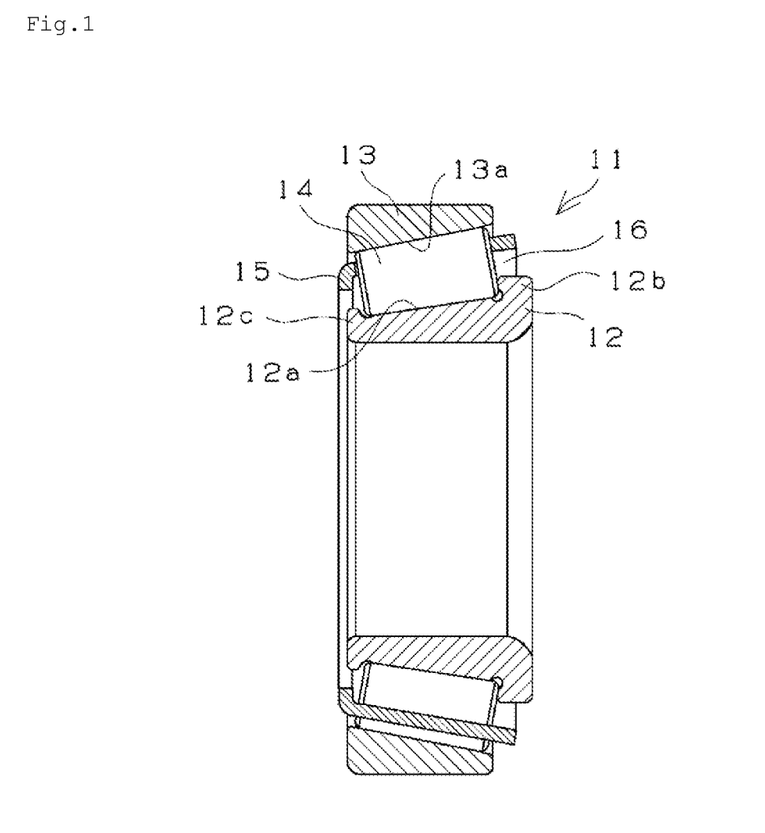
FIG. 1 is a sectional view showing an example of a tapered roller bearing of the present invention.

An example of a tapered roller bearing of the present invention will be described with reference to FIG. 1. As shown in FIG. 1, a tapered roller bearing 11 includes an inner ring 12 having a tapered raceway surface 12a on an outer peripheral surface thereof, an outer ring 13 having a tapered raceway surface 13a on an inner peripheral surface thereof, a plurality of tapered rollers 14 configured to roll between the raceway surface 12a of the inner ring 12 and the raceway surface 13a of the outer ring 13, and a retainer 15 configured to rollably retain each roller 14 at each pocket part. The retainer 15 is formed by a large diameter ring part and a small diameter ring part connected by a plurality of column parts. The retainer 15 houses the tapered roller 14 in the pocket part between the column parts. In the inner ring 12, a large flange 12b is integrally formed on a large diameter side end portion, and a small flange 12c is integrally formed on a small diameter side end portion. The inner ring of the tapered roller bearing has a tapered raceway surface and thus a small diameter side and a large diameter side seen from an axial direction. The "small flange" is a flange formed on the small diameter side end portion and the "large flange" is a flange formed on the large diameter side end portion. When a load is applied, the tapered roller 14 is pressed toward the large diameter side, and thus the large flange 12b receives this load. Further, the tapered roller 14 is prevented from dropping off toward the small diameter side by the small flange 12c until the bearing is assembled into each device.

In FIG. 1, the tapered roller 14 is subjected to rolling friction between the raceway surface 12a of the inner ring 12 and the raceway surface 13a of the outer ring 13 and sliding friction on the large flange 12b of the inner ring 12. In order to reduce these frictions, grease 16 is filled at least around the tapered rollers 14. This grease 16 corresponds to the grease composition for a tapered roller bearing of the present invention. When the tapered roller bearing 11 is used, a large load is applied to especially in portions of the large flange 12b and the tapered roller 14 that get into sliding contact with each other. Thus, these portions are easily damaged, which affects the bearing lifetime.

In the tapered roller bearing of the present invention, the bearing components such as the inner ring, the outer ring and the tapered rollers are formed of iron-based metal material. As the iron-based metal material, bearing steel, carburized steel, carbon steel for mechanical structure, cold-rolled steel, or hot-rolled steel may be adopted. Of these steels, the carburized steel is preferable because of its superior heat resistance. Examples of the carburized steel include SCM415 and the like. The iron-based metal materials used in respective bearing components may be different from each other.

The grease composition for a tapered roller bearing of the present invention is defined by the frequency in which the storage modulus G' of the grease composition, which varies depending on frequency, becomes minimum. The storage modulus G' is measured by a dynamic viscoelasticity analysis method defined in JIS K 7244, using a rheometer. The storage modulus G' indicates an elastic component in a dynamic viscoelasticity. Specifically, the storage modulus G' is a rate of the elastic stress at the same phase as the strain caused when the external force is applied to the grease, and is equivalent to the energy which can be elastically stored, among the external force applied to the grease.

Figure 2:
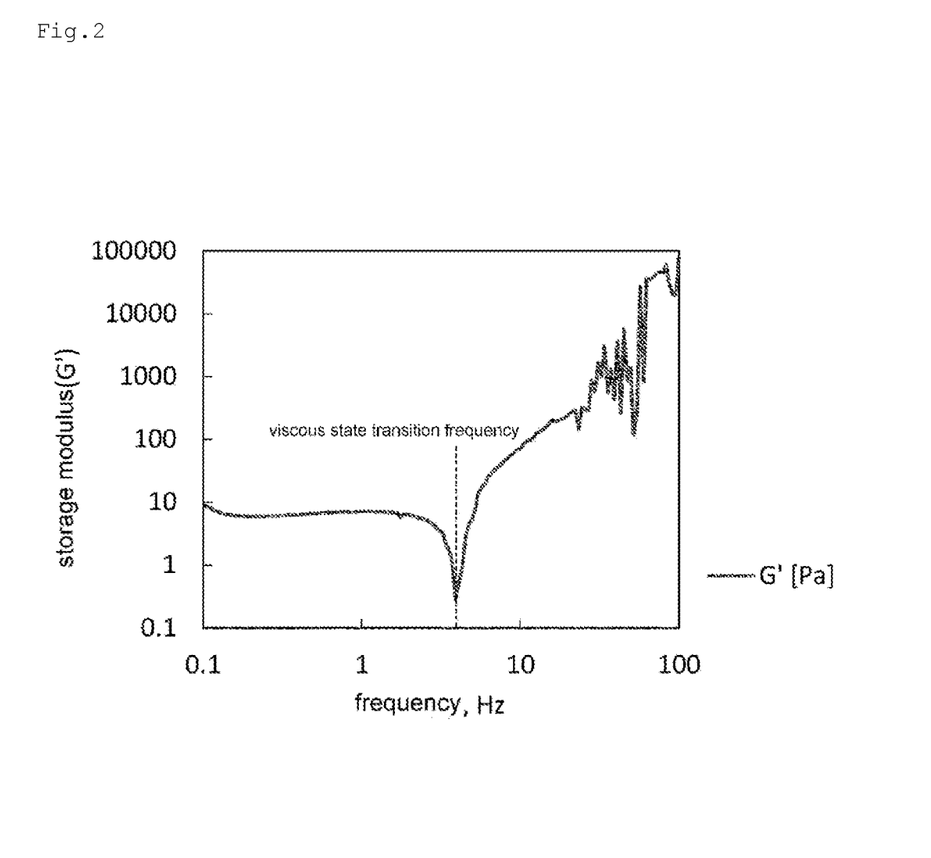
FIG. 2 is a graph showing an example of a relation between a storage modulus and a frequency.

FIG. 2 shows a result of the dynamic viscoelasticity analysis changing the frequency by using a rheometer. FIG. 2 shows a graph of the storage modulus G' at each frequency in which the storage modulus G' is shown in the vertical axis and the frequency is shown in the horizontal axis. In the dynamic viscoelasticity analysis in FIG. 2, when the frequency is changed from a lower frequency to a higher frequency, a state of the grease is changed and the storage modulus becomes minimum at a specified frequency. This behavior indicates that the grease is solid in the low frequency range, while the structure kept in solid is broken at the frequency in which the storage modulus becomes minimum. Further, the grease is liquid in the high frequency range higher than the frequency in which the storage modulus becomes minimum. Thus, it is determined that the grease is transited into a viscous state at the frequency in which the storage modulus becomes minimum. In the present invention, the frequency in which the storage modulus becomes minimum is defined as a "viscous state transition frequency". The present invention is characterized in that the viscous state transition frequency of the grease composition is equal to 7 Hz or more.

In a case in which the viscous state transition frequency of the grease composition is equal to 7 Hz or more, the grease remains on the flange part and thereby superior lubrication performance is obtained. As a result, the lifetime can be extended. In a case in which the viscous state transition frequency is less than 7 Hz, the grease hardly remains on the flange part and the lifetime is apt to be short. In the present invention, the viscous state transition frequency of the grease composition is preferably equal to 10

Hz or more, more preferably 20 Hz or more. The upper limit of the viscous state transition frequency is 100 Hz or less, and preferably 50 Hz or less.

The condition when the viscous state transition frequency is measured is preferably a measurement temperature of 25° C. and a strain amount of 100%. Further, it is preferable to use a rheometer having a parallel plate type cell.

The grease composition for a tapered roller bearing of the present invention contains a base oil, a thickener, and an additive. The base oil is not especially limited, and therefore a general base oil normally used in a field of grease may be adopted. Examples of the base oil include synthetic oil such as highly refined oil, ether oil, ester oil, synthetic hydrocarbon oil, silicon oil and fluorine oil, and mineral oil such as spindle oil, refrigerator oil, turbine oil, machine oil and dynamo oil. Further, mixed oil of any of these oils may be adopted. In the present invention, the synthetic oil is preferably used as the base oil. Further, it is more preferable that 50 mass % or more of the base oil is ester oil.

Dynamic viscosity of the base oil (in case of mixed oil, the dynamic viscosity of the mixed oil) is preferably 100-200 $mm^2/s$ at 40° C., more preferably 150-200 $mm^2/s$, and further more preferably 150-180 $mm^2/s$.

The base oil is preferably contained by 60-95 mass % to a total amount (base grease) of the base oil and the thickener. In a case in which the content of the base oil is less than 60 mass %, the lifetime might be reduced. In case in which the content of the base oil is more than 95 mass %, the thickener is relatively decreased and thereby it might be difficult to be turned into a greasy state. The base oil is more preferably contained by 80-90 mass % to the total amount of the base oil and the thickener.

The thickener used in the grease of the present invention is not especially limited, and therefore a general thickener normally used in a field of grease may be adopted. For example, soap-based thickener such as metal soap and complex metal soap, or non-soap-based thickener such as bentone, silica gel, diurea compound, triurea compound, tetraurea compound and urea-urethane compound may be adopted. Examples of the metal soap include sodium soap, calcium soap and lithium soap. An example of the complex metal soap includes complex lithium soap. Of these thickeners, it is preferable to adopt the complex lithium soap or the diurea compound as the thickener.

The complex lithium soap is compounded from lithium hydroxide, aliphatic monocarboxylic acid, and dibasic acid such as aliphatic dicarboxylic acid. Examples of the aliphatic monocarboxylic acid include stearic acid, 12-hydroxystearic acid, 12-hydroxylauric acid, and 16-hydroxypalmitic acid. Examples of the aliphatic dicarboxylic acid include azelaic acid, sebacic acid, oxalic acid, malonic acid, succinic acid, glutaric acid, adipic acid, pimelic acid, suberic acid, undecandioic acid, and dodecanedioic acid.

Of these complex lithium soaps, it is preferable to adopt a combination of 10 C or more aliphatic monocarboxylic acid and 9 C or less aliphatic dicarboxylic acid. In particular, the stearic acid is preferable as the 10 or more aliphatic monocarboxylic acid, and the azelaic acid is preferable as the 9 C or less aliphatic dicarboxylic acid.

The diurea compound is obtained by causing a diisocyanate component and a monoamine component to react with each other. Examples of the diisocyanate component include phenylene diisocyanate, and diphenylmethane disocyanate (MDI). As the diurea compound, aliphatic diurea compound, alicyclic diurea compound, or aromatic diurea compound may be adopted, which are distinguished by a kind of substituent of the used monoamine component. In a case of the aliphatic diurea compound, aliphatic monoamine (octyl amine or the like) is adopted as the monoamine component. In a case of the alicyclic diurea compound, alicyclic monoamine (cyclohexylamine or the like) is adopted as the monoamine component. In a case of the aromatic diurea compound, aromatic monoamine (p-toluidine or the like) is adopted as the monoamine component.

The base grease containing the complex lithium soap as the thickener is produced by causing the aliphatic monocarboxylic acid, the aliphatic dicarboxylic acid, and lithium hydroxide to react with each other in the base oil. Further, the base grease containing the diurea compound as the thickener is produced by causing the diisocyanate component and the monoamine component to react with each other in the base oil. A compound rate of the thickener in the base grease is preferably 5-30 mass %, and more preferably 10-20 mass %.

The additive to be used in the grease composition of the present invention preferably contains a phosphorus-based extreme pressure agent. The phosphorus-based extreme pressure agent is a compound containing phosphorus in the molecular structure, and a well-known extreme pressure agent may be adopted. Examples of the phosphorus-based extreme pressure agent include phosphoric acid ester such as tricresyl phosphate and triphenyl phosphate, acidic phosphoric acid ester, phosphorous acid ester such as tricresyl phosphite and triphenyl phosphite, acidic phosphorous acid ester, thiophosphate, thiophosphite, zinc alkyldithiophosphate (ZnDTP), and molybdenum alkyldithiophosphate (MoDTP). Any of these may be adopted independently, or a combination of any of these may be adopted. It is preferable to adopt the extreme pressure agent other than zinc alkyldithiophosphate as the phosphorus-based extreme pressure agent, and it is more preferable to adopt alkylated triphenyl phosphate which is superior in oxidation stability and thermal stability.

It is preferable that the phosphorus-based extreme pressure agent contains 0.05-0.3 mass % of phosphorus relative to the whole of the grease composition. With such a numeral range, superior extreme pressure performance is obtained and the shear stability is maintained. It is more preferable that the phosphorus-based extreme pressure agent contains 0.1-0.2 mass % of phosphorus relative to the whole of the grease composition.

Further, the additive preferably contains a calcium-based additive or a barium-based additive. An example of the calcium-based additive includes over-based calcium sulfonate. An example of the barium-based additive includes over-based barium sulfonate. Total base number (TBN) of the calcium sulfonate or the barium sulfonate is not especially limited, however the total base number of 10-500 mg KOH/g is preferable, 50-400 mg KOH/g is more preferable, and 100-400 mg KOH/g is furthermore preferable. TBN is measured based on JIS K 2501.

It is preferable that the calcium-based additive preferably contains 0.05-0.3 mass %, more preferably 0.1-0.2 mass %, of calcium relative to the whole of the grease composition. In the relation with the content of the phosphorus-based extreme pressure agent, it is further more preferable that, in the grease composition, the phosphorus element content derived from the phosphorus-based extreme pressure agent is more than the calcium element content derived from the calcium-based additive. Further, it is preferable that the barium-based additive preferably contains 0.05-0.3 mass %, more preferably 0.1-0.2 mass % of barium relative to the whole of the grease composition.

A known additive may be added as needed to the above-described grease composition. Examples of the additive include an antioxidant such as amine-based compound and phenol-based compound, a solid lubrication such as graphite, and an oily agent such as ester and alcohol.

The worked penetration (JIS K 2220) of the grease composition to be used in the present invention is preferably in a range of 200-350. Ina case in which the worked penetration is less than 200, a lack of lubrication might be caused because of less oil separation. In a case in which the worked penetration is more than 350, the grease composition is so soft that the grease composition is liable to undesirably leak out. The worked penetration is more preferably in a range of 250-300.

The tapered roller bearing of the present invention is preferably used under a condition of high temperature and a condition of high load. A specific value of the condition of high load is the maximum contact surface pressure on the raceway ring of 0.5 GPa or more, and a surface pressure on the flange plate (a large flange in the tapered roller bearing) of 0.07 GPa or more, preferably 0.1 GPa or more. The condition of high temperature is for example, 80° C. or more, preferably 100° C. or more, more preferably 120° C. or more.

Figure 3:
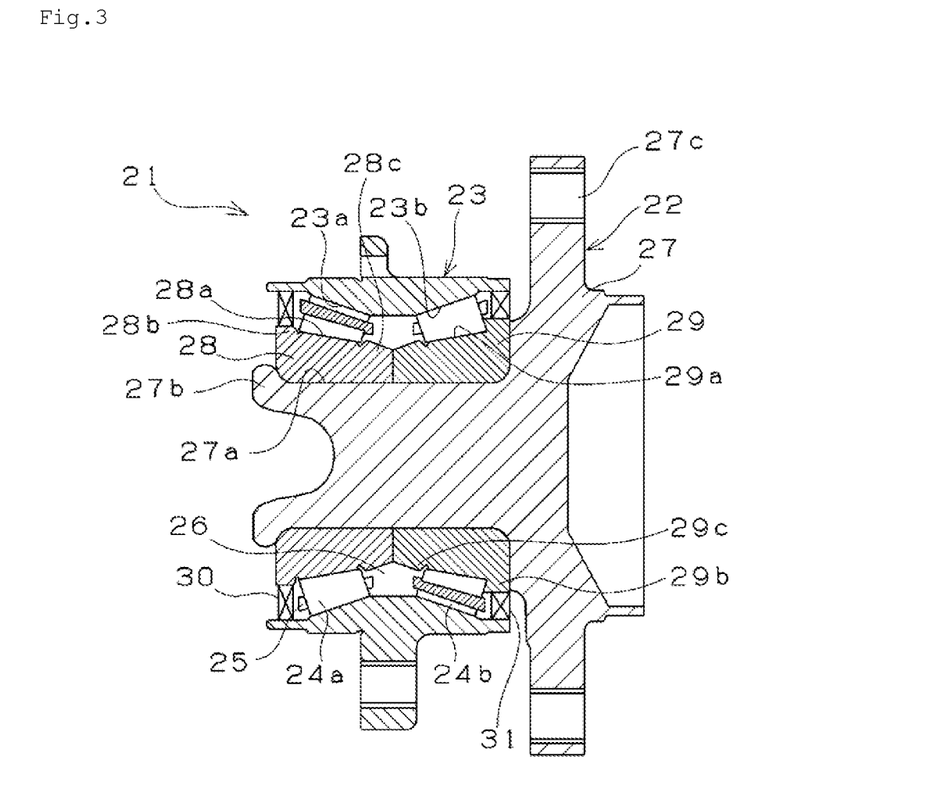
FIG. 3 is a sectional view showing an example using the tapered roller bearing of the present invention as a tapered hub unit.

The tapered roller bearing of the present invention can be used as a tapered hub unit that rotatably supports a wheel of a vehicle. FIG. 3 is a sectional view of the tapered hub unit. As shown in FIG. 3, a tapered hub unit 21 includes an inner ring 22 that rotates together with a wheel component, an outer ring 23 arranged to face the inner ring 22 and non-rotatably fixed to a vehicle body component, a plurality of tapered rollers (rolling elements) 24a, 24b. The tapered rollers 24a, 24b are rollably housed between raceway surfaces 28a, 23a and between raceway surfaces 29a, 23b that are double-row. The raceway surfaces 28a, 23a are formed on the inner ring 22 and the outer ring 23, respectively, to face each other. The raceway surfaces 29a, 23b are formed on the inner ring 22 and the outer ring 23, respectively, to face each other. The tapered rollers 24a, 24b are rollably held one by one in pockets formed in a retainer 25. Here, "outside" in an axial direction denotes an outer side in a width direction in a state in which the tapered hub unit 21 is assembled to a vehicle, and "inside" denote a center side in the width direction.

The inner ring 22 includes a hub wheel 27 that rotates together with a wheel (not shown), and two inner ring members 28, 29 that are fitted onto an outer peripheral surface of the hub wheel 27 and arranged in a state in which small diameter side end portions abut on each other. The hub wheel 27 has a wheel mount flange 27c to which the wheel is mounted, formed integrally with the hub wheel 27 on one end portion thereof. Further, a stepped portion 27a that extends in the axial direction is formed on the hub wheel 27.

The inner ring members 28, 29 are press-fitted to the stepped portion 27a of the hub wheel 27. A caulking portion 27b formed by plastically deforming an end portion at the inner side in the axial direction of the hub wheel 27, toward the outer side in the radial direction, prevents the inner ring members 28, 29 from dropping off from the hub wheel 27 in the axial direction. The inner ring member 28 is arranged at the inner side in the axial direction of the hub wheel 27. The raceway surface 28a that faces the raceway surface 23a of the outer ring 23 is formed on an outer peripheral surface of the inner ring member 28. The inner ring member 29 is arranged at the outer side in the axial direction of the hub wheel 27. The raceway surface 29a that faces the raceway surface 23b of the outer ring 23 is formed on an outer peripheral surface of the inner ring member 29.

Each of the inner ring member 28 and the inner ring member 29 are formed in a substantially truncated cone shape having a small diameter side end portion and a large diameter side end portion. Large flanges 28b, 29b that protrude outward in the radial direction are formed on outer peripheral surfaces of the large diameter side end portions of the inner ring members 28, 29, respectively. Small flanges 28c, 29c that protrude outward in the radial direction are formed on outer peripheral surfaces of the small diameter side end portions of the inner ring members 28, 29, respectively. The raceway surface 28a is formed between the small flange 28c and the large flange 28b. The raceway surface 29a is formed between the small flange 29c and the large flange 29b. The tapered rollers 24a, 24b are subjected to rolling friction between the raceway surfaces 28a, 29a of the inner ring 22 and the raceway surfaces 23a, 23b of the outer ring 23 and sliding friction on the large flanges 28b, 29b of the inner ring 22, respectively.

The outer ring 23 has a wheel mount flange formed integrally on an outer periphery thereof. The raceway surfaces 23a, 23b are formed on the inner peripheral surface of the outer ring 23. Sealing members 30, 31 are disposed on both ends in the axial direction of the outer ring 23. The sealing member 30 seals between the outer ring 23 and the inner ring member 28. The sealing member 31 seals between the outer ring 23 and the inner ring member 29. Grease 26 is filled in an inner space surrounded by the sealing member 30, the outer ring 23, the sealing member 31 and the inner ring 22. The grease 26 is supplied for lubrication in rolling contact or sliding contact between the rolling surfaces of the tapered rollers 24a, 24b and the raceway surfaces 28a, 29a of the inner ring and between the rolling surfaces of the tapered rollers 24a, 24b and the raceway surfaces 23a, 23b of the outer ring. The grease composition described above is adopted as the grease 26.

The tapered roller bearing of the present invention has superior bearing lifetime under the condition of high temperature and the condition of high load, and therefore the tapered roller bearing is suitable to a tapered hub unit that rotatably supports a wheel of a vehicle (in particular, large vehicle). Here, the "large vehicle" is not especially limited, but examples thereof include a truck such as a 2 or more-ton truck, a passenger vehicle (van or bus), a traction vehicle (trailer or tank lorry) and a special vehicle such as crane vehicle.

The tapered roller bearing of the present invention is not limited to the examples shown in FIGS. 1 and 3. For example, in the examples shown in FIGS. 1 and 3, the flange part is formed in the inner ring, however the flange part may be formed in the outer ring. Further, in the example shown in FIG. 3, the outer ring and the hub wheel may be integrally formed.

EXAMPLES

The present invention will be described in detail with reference to examples and comparative examples, however the scope of the present invention is not limited by those examples.

Test greases are respectively adjusted to have the compositions shown in Table 1. The complex lithium soap shown in Table 1 is formed by causing azelaic acid and stearic acid to react with each other. In Table 1, each of element contents in the additives denotes a content rate (mass %) of each element (phosphorus, calcium or the like) derived from each additive, relative to the whole grease.

Each of the base oils shown in Table 1 is as below.

Synthetic oil 1 (ester oil): H2372 (dynamic viscosity of 120 mm²/s at 40° C.) produced by HATCO Corporation
Mineral oil 1: Daphne Turbine Oil 100 (dynamic viscosity of 98.6 mm²/s at 40° C.) produced by Idemitsu Kosan Co., Ltd.
Mineral oil 29: Daphne Eternity Oil D (dynamic viscosity of 227.3 mm²/s at 40° C.) produced by Idemitsu Kosan Co., Ltd.
Synthetic oil 2: Mobil SHC627 (dynamic viscosity of 100 mm²/s at 40° C.) produced by EMG Lubricants G.,K.
Synthetic oil 3: Mobil SHC630 (dynamic viscosity of 220 mm²/s at 40° C.) produced by EMG Lubricants G.,K.

The measurement of the worked penetration, the measurement of the dynamic viscoelasticity, and a high temperature grease lifetime test were performed to the obtained test greases. The results thereof are also shown in Table 1.

(1) Measurement of Worked Penetration

The worked penetration was measured based on JIS K 2220.

(2) Measurement of Dynamic Viscoelasticity

Figure 4:
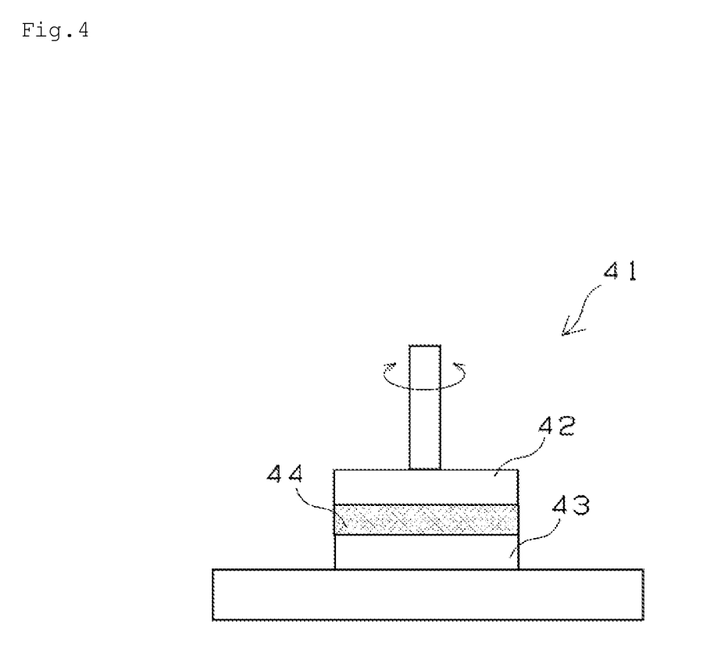
FIG. 4 is a view showing a dynamic viscoelasticity analysis using a rheometer.

The dynamic viscoelasticity of the grease was measured using a parallel plate type rheometer 41 shown in FIG. 4. As shown in FIG. 4, test grease 44 is put on a lower plate 43 with φ 25 mm and the test grease 44 is interposed between the lower plate 43 and an upper plate 42 with φ 25 mm. A gap between the plates is set to 0.1 mm. The storage modulus is measured from the phase difference between the periodic strain and shear stress waveforms caused in the test grease 44 due to vibration generated by rotating the upper plate 42. The measurement is performed at temperature of 25° C. and strain of 100% (swing angle 4.6 degrees) by changing the frequency from 0.1 Hz to 30 Hz. The graph of the relation between the storage modulus and the frequency shown in FIG. 2 is obtained from the measured result, and the frequency in which the storage modulus becomes minimum is acquired as the viscous state transition frequency.

(3) High Temperature Grease Lifetime Test

Each test grease is sealed in the tapered roller bearing of 4T-30204 to obtain each test bearing. By rotating the obtained test bearing at rotation speed of 5,000 min$^{-1}$ under the condition of temperature of 120° C., an axial load of 640 N and a radial load of 67 N (Load condition A), the time until seizure of the bearing is caused is measured. Under Load condition A, the maximum contact surface pressure on the raceway ring is 0.5 GPa, and the surface pressure on the large flange of the inner ring is 0.07 GPa. The grease lifetime of 800 hours or more is determined as acceptable. The test result is shown in Table 1.

Similarly, by rotating each test bearing at rotation speed of 5,000 min$^{-1}$ under the condition of temperature of 120° C., an axial load of 2,940 N and a radial load of 5,880 N (Load condition B), the time until seizure of the bearing is caused is measured. Under Load condition B, the maximum contact surface pressure on the raceway ring is 2.0 GPa, and the surface pressure on the large flange of the inner ring is 0.18 GPa. The grease lifetime of 100 hours or more is determined as acceptable in Load condition B. The test result is shown in Table 1.

TABLE 1

| | Example 1 | Example 2 | Example 3 | Comparative example 1 | Comparative example 2 | Comparative example 3 | Comparative example 4 |
|---|---|---|---|---|---|---|---|
| Composition of base oil and thickener (mass %) | | | | | | | |
| Base oil | | | | | | | |
| Synthetic oil 1 | 42 | — | — | — | — | — | — |
| Mineral oil 1 | — | 86 | — | — | 86 | 86 | 86 |
| Mineral oil 2 | — | — | — | 40 | — | — | — |
| Synthetic oil 2 | — | — | 86 | 40 | — | — | — |
| Synthetic oil 3 | 42 | — | — | — | — | — | — |
| Thickener | | | | | | | |
| Complex lithium soap | 16 | — | 14 | — | — | — | 14 |
| Aliphatic diurea compound 1) | — | 8 | — | — | 14 | — | — |
| Alicyclic diurea compound 2) | — | 6 | — | — | — | — | — |
| Aromatic diurea compound 3) | — | — | — | 20 | - | 14 | — |
| Element content (mass %) in additive to the whole grease | | | | | | | |
| P (phosphorus-based extreme pressure agent) | 0.2 | 0.1 | 0.2 | — | — | — | — |
| Ca | 0.1 | — | — | — | — | — | — |
| Ba | — | 0.1 | — | — | — | — | — |
| Mo | 0.6 | - | — | 0.5 | — | — | — |
| Zn | — | — | 0.3 | 0.1 | — | — | — |
| S | 2.4 | 1.0 | 0.9 | 1.3 | 0.3 | 0.3 | 0.3 |
| Property | | | | | | | |
| Dynamic viscosity of base oil at 40° C. (mm²/s) | 170 | 100 | 100 | 160 | 100 | 100 | 100 |

TABLE 1-continued

| | Example 1 | Example 2 | Example 3 | Comparative example 1 | Comparative example 2 | Comparative example 3 | Comparative example 4 |
|---|---|---|---|---|---|---|---|
| Worked penetration (JIS K 2220) | 300 | 260 | 250 | 300 | 240 | 320 | 250 |
| Viscous state transition frequency (Hz) | 21.2 | 14.6 | 7.5 | 5.1 | 5.2 | 6.6 | 3.9 |
| High temperature grease lifetime test (hours) | | | | | | | |
| Load condition A: Fa = 640N, Fr = 67N | 1,633 | 1,182 | 856 | 146 | 439 | 576 | 89 |
| Load condition B: Fa = 2,940N, Fr = 5,880N | 165 | 168 | 129 | 26 | 39 | 22 | 8 |

1) octyl amine + MDI
2) cyclohexylamine + MDI
3) p-toluidine + MDI

According to Table 1, the viscous state transition frequency of each grease of Examples 1 to 3 is equal to 7 Hz or more, which is thereby determined as acceptable in both Load condition A and Load condition B. On the other hand, the viscous state transition frequency of each grease of Comparative examples 1 to 4 is less than 7 Hz, and the lifetime is too short, which is thereby determined as unacceptable in the high temperature grease lifetime test. In the grease of Example 3 and the grease of Comparative example 4, the thickeners, the viscosities of the base oils, and the penetrations are identical to each other, while the viscous state transition frequencies are different from each other. As a result, Example 3 shows lifetime approximately 10 times longer in Load condition A and approximately 16 times longer in Load condition B than Comparative example 4. It is considered that the additive (in particular, the phosphorus-based extreme pressure agent) contributes to make the viscous state transition frequency higher.

It is found that the viscous state transition frequencies of the greases of Examples 1 to 3 according to the present invention are equal to 7 Hz or more so that the bearing lifetime can be extended. Based on such knowledge, by comparing the viscous state transition frequency of the grease with the predetermined threshold of the frequency (for example, 7 Hz), the bearing lifetime of the grease composition for a tapered roller bearing can be evaluated in advance. Specifically, the viscous state transition frequency of the grease composition measured by the dynamic viscoelasticity analysis is compared with the threshold (7 Hz), and in a case in which the viscous state transition frequency is equal to 7 Hz or more, it is determined that the lifetime is superior. Further, according to Table 1, a tendency is found in which the lifetime becomes longer as the viscous state transition frequency is higher. Therefore, the viscous state transition frequency can be used as an index for determining the superiority or inferiority of the bearing lifetime. For example, the viscous state transition frequencies of the grease compositions are measured and then it can be determined that the grease composition of which the viscous state transition frequency is the highest, is the most superior in bearing lifetime. In this manner, the present invention can be also applied to the prediction of the bearing lifetime of the grease composition.

INDUSTRIAL APPLICABILITY

The grease composition for a tapered roller bearing of the present invention has superior bearing lifetime under the condition of high temperature and the condition of high load and therefore the grease composition is widely used as grease for a tapered roller bearing used under such conditions. Further, the tapered roller bearing of the present invention is preferably used as a tapered roller bearing of a tapered hub unit that rotatably supports a wheel of a vehicle.

REFERENCE SIGNS LIST

11: tapered roller bearing
12: inner ring
13: outer ring
14: tapered roller
15: retainer
16: grease
21: tapered hub unit
22: inner ring
23: outer ring
24: tapered roller
25: retainer
26: grease
27: hub wheel
28: inner ring member
29: inner ring member
30: sealing member
31: sealing member

The invention claimed is:
1. A tapered roller bearing comprising:
an inner ring member having a tapered raceway surface on an outer peripheral surface that is fitted onto an outer peripheral surface of a hub wheel that has a wheel mount flange formed integrally and rotates together with the wheel;
an outer ring having a tapered raceway surface on an inner peripheral surface;
a plurality of tapered rollers that roll between the raceway surface of the inner ring and the raceway surface of the outer ring; and
a grease composition filled around the tapered rollers,
wherein the inner ring member has a flange part configured to get into sliding contact with the tapered rollers,
wherein the tapered roller bearing is configured to be used under a high load condition, where the condition of the high load is a maximum contact surface pressure on the inner ring and the outer ring of 0.5 GPa or more and a surface pressure on the flange part of 0.1 GPa or more and, wherein the tapered roller bearing is configured to be used as a tapered hub unit that rotatably supports a wheel of a vehicle, the grease composition comprising a base oil, a thickener and an additive, wherein a frequency in which a storage modulus, which varies depending on a frequency, of the grease composition which becomes minimum is equal to 7 Hz or more, wherein the thickener is an aliphatic diurea compound and an alicyclic diurea compound, wherein the additive contains an extreme pressure agent including phosphorus in a molecular structure, and wherein the extreme pressure agent contains 0.05-0.3 mass % of phosphorus relative to the total weight of the grease composition.

2. The tapered roller bearing as defined in claim 1, wherein the additive further contains a barium-based additive, and wherein the barium-based additive contains 0.05-0.3 mass % of barium relative to the grease composition.

3. The tapered roller bearing as defined in claim 1, wherein:

the tapered roller bearing is configured to be used under a condition of high temperature and a condition high load, the condition of high temperature is a temperature of 80° C.

\* \* \* \* \*